United States Patent

Bach et al.

[11] Patent Number: 5,281,572
[45] Date of Patent: Jan. 25, 1994

[54] BICHROMORPHIC METHINE AND AZAMETHINE DYES AND PROCESS FOR TRANSFERRING THEM

[75] Inventors: Volker Bach, Neustadt; Karl-Heinz Etzbach, Frankenthal; Ruediger Sens, Mannheim, all of Fed. Rep. of Germany

[73] Assignee: BASF Aktiengesellschaft, Ludwigshafen, Fed. Rep. of Germany

[21] Appl. No.: 971,598

[22] Filed: Nov. 5, 1992

Related U.S. Application Data

[62] Division of Ser. No. 850,908, Mar. 13, 1992, Pat. No. 5,214,140, which is a division of Ser. No. 650,219, Feb. 4, 1991, Pat. No. 5,132,438.

[30] Foreign Application Priority Data

Feb. 15, 1990 [DE] Fed. Rep. of Germany ....... 4004612

[51] Int. Cl.$^5$ .................. B41M 5/035; B41M 5/38
[52] U.S. Cl. ................... 503/227; 428/195; 428/913; 428/914
[58] Field of Search ................ 8/471; 428/195, 913, 428/914; 503/227; 552/295, 300, 302

[56] References Cited

U.S. PATENT DOCUMENTS

| | | |
|---|---|---|
| 3,013,013 | 12/1961 | Carboni . |
| 3,096,339 | 7/1963 | Martin . |
| 3,386,491 | 6/1968 | Weaver et al. . |
| 3,553,245 | 1/1971 | Weaver et al. . |
| 3,956,266 | 5/1976 | Morey et al. ............... 544/73 |
| 4,541,830 | 9/1985 | Hotta et al. ............... 8/471 |
| 4,695,287 | 9/1987 | Evans et al. ............... 8/471 |
| 4,769,360 | 9/1988 | Evans et al. ............... 503/227 |
| 4,810,615 | 3/1989 | Boie et al. ............... 430/203 |
| 4,822,884 | 4/1989 | Hubele ............... 544/128 |
| 4,829,047 | 5/1989 | Niwa et al. ............... 503/227 |
| 4,839,336 | 6/1989 | Evans et al. ............... 503/227 |
| 4,851,409 | 7/1989 | Young et al. ............... 544/128 |
| 4,923,638 | 5/1990 | Ohno et al. ............... 252/587 |

FOREIGN PATENT DOCUMENTS

| | | |
|---|---|---|
| 0111004 | 6/1984 | European Pat. Off. . |
| 0133011 | 2/1985 | European Pat. Off. . |
| 0133012 | 2/1985 | European Pat. Off. . |
| 0147747 | 7/1985 | European Pat. Off. . |
| 0192435 | 8/1986 | European Pat. Off. . |
| 0216483 | 4/1987 | European Pat. Off. . |
| 0227092 | 7/1987 | European Pat. Off. . |
| 0227094 | 7/1987 | European Pat. Off. . |
| 0227095 | 7/1987 | European Pat. Off. . |
| 0227096 | 7/1987 | European Pat. Off. . |
| 2519592 | 11/1975 | Fed. Rep. of Germany . |
| 3020473 | 12/1980 | Fed. Rep. of Germany . |
| 3524519 | 1/1986 | Fed. Rep. of Germany . |
| 1201925 | 8/1970 | United Kingdom . |

OTHER PUBLICATIONS

Patent Abstracts of Japan, JP-A-61,127,392, Jun. 14, 1986.
Patent Abstracts of Japan, JP-A-61 199-997, Sep. 4, 1986.
Patent Abstracts of Japan, JP-A-61 283-595, Dec. 13, 1986.
Patent Abstracts of Japan, JP-A-61 237-694, Oct. 22, 1986.

*Primary Examiner*—B. Hamilton Hess
*Attorney, Agent, or Firm*—Oblon, Spivak, McClelland, Maier & Neustadt

[57] ABSTRACT

Bichromophoric methine and azamethine transfer dyes have the formula $$Z^2-Z^1-LY^1-Y^2$$

wherein
  L is a bridge member which does not permit any conjugation of $\pi$-electrons between $Z^1$ and $Y^1$,
  $Y^1$ and $Z^1$ are each independently of the other aminophenylene, which may be benzofused, or heterocyclyl and
  $Y^2$ and $Z^2$ are each independently of the other benzoquinoneiminyl, which may be benzofused, or heterocyclyl.

7 Claims, No Drawings

BICHROMORPHIC METHINE AND AZAMETHINE DYES AND PROCESS FOR TRANSFERRING THEM

This is a division of application Ser. No. 07/850,908, now U.S. Pat. No. 5,214,140 filed on Nov. 13, 1992, which is a division of Ser. No. 07/650,219 filed on Feb. 4, 1991 now U.S. Pat. No. 5,132,438.

The present invention relates to novel bichromophoric dyes of the formula I $$Z^2-Z^1-L-Y^1-Y^2 \quad (I)$$

wherein

L is a bridge member which does not permit any conjugation of $\pi$-electrons between $Z^1$ and $Y^1$, $Z^1$ and $Y^1$ are identical or different and, together with the bridge member L, each is independently of the other a radical of the formula

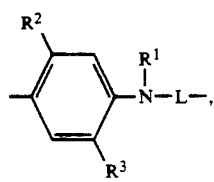 (IIa)

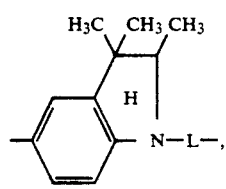 (IIb)

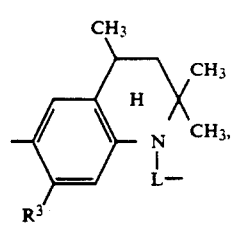 (IIc)

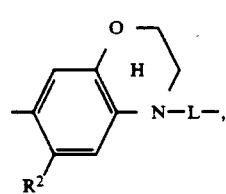 (IId)

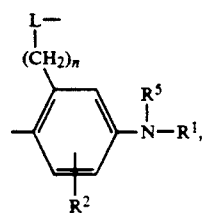 (IIe)

-continued

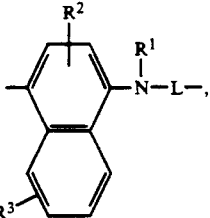 (IIf)

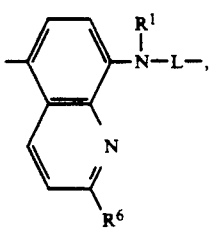 (IIg)

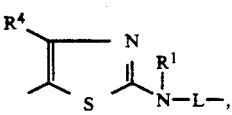 (IIh)

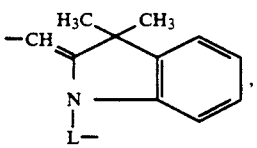 (IIi)

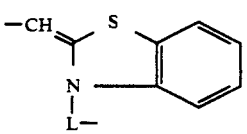 (IIj)

or

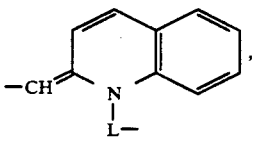 (IIk)

where n is 0 or 1, $R^1$ and $R^5$ are identical or different and each is independently of the other alkyl, alkoxyalkyl, alkoxycarbonylalkyl or alkanoyloxyalkyl, which may each have up to 10 carbon atoms and by hydroxyl- or cyano-substituted, hydrogen, benzyl, cyclohexyl, phenyl or tolyl, $R^2$ and $R^3$ are identical or different and each is independently of the other hydrogen, $C_1$-$C_8$-alkyl, $C_1$-$C_6$-alkoxy, $C_1$-$C_6$-alkanoylamino or $C_1$-$C_6$-alkylsulfonylamino, $R^4$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxy-substituted benzyl, cyclohexyl, thienyl or —$NHR^1$, where $R^1$ is as defined above, and $R^6$ is hydrogen or $C_1$-$C_8$-alkyl, and $Z^2$ and $Y^2$ are identical or different and each is independently of the other a radical of the formula

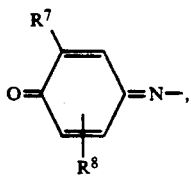 (IIIa)

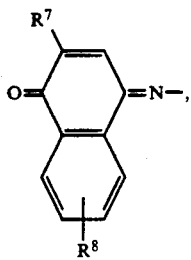 (IIIb)

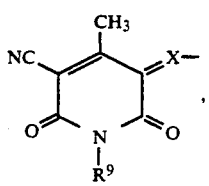 (IIIc)

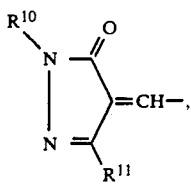 (IIId)

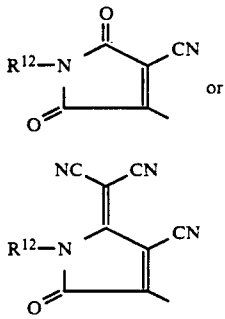 or (IIIf)

where
X is nitrogen or CH,
$R^7$ is $C_1$–$C_6$-alkoxycarbonyl, $C_1$–$C_6$-monoalkylcarbamoyl, $C_1$–$C_6$-monoalkylsulfamoyl, $C_1$–$C_6$-alkanoylamino or $C_1$–$C_6$-alkylsulfonylamino, wherein alkyl may in each case be interrupted by 1 or 2 oxygen atoms, or $C_5$–$C_7$-cycloalkoxycarbonyl, $C_5$–$C_7$-monocycloalkylcarbamoyl, $C_5$–$C_7$-monocycloalkylsulfamoyl, $C_5$–$C_7$-cycloalkylcarbonylamino, phenoxycarbonyl, monophenylcarbamoyl, monophenylsulfamoyl, benzoylamino, phenylsulfonylamino, methylsulfonylamino, fluorine or chlorine,
$R^8$ is $C_1$–$C_8$-alkyl, $C_1$–$C_6$-alkanoylamino or $C_1$–$C_6$-alkylsulfonylamino, wherein alkyl may in each case be interrupted by 1 or 2 oxygen atoms, or $C_5$–$C_7$-cycloalkylcarbonylamino, $C_5$–$C_7$-cycloalkylsulfonylamino, benzoylamino, phenylsulfonylamino, hydrogen, fluorine or chlorine,
$R^9$ is hydrogen or $C_1$–$C_8$-alkyl which may be interrupted by 1 or 2 oxygen atoms,
$R^{10}$ is phenyl or $C_1$–$C_4$-alkylphenyl,
$R^{11}$ is $C_1$–$C_8$-alkyl or $C_1$–$C_6$-dialkylamino, and
$R^{12}$ is hydrogen or $C_1$–$C_8$-alkyl.

Bichromophoric methine dyes with dicyanovinyl groups are known from GB-A-L 201 925, U.S. Pat. No. 3,553,245, DE-A-1 569 678, DE-A-2 519 592 and DE-A-3 020 473.

It is an object of the present invention to provide novel bichromophoric methine and azamethine dyes which should have advantageous application properties.

We have found that this object is achieved by the bichromophoric dyes of the formula I defined at the beginning.

The bridge member L, which does not permit any conjugation of $\pi$-electrons between $Z^1$ and $Y^1$, generally conforms to the formula $$-E^1-D-E^2-$$

where
D is a chemical bond, oxygen, $-SO_2-$, $-O-CO-O-$, 1,4-cyclohexylene, phenylene, $-O-CO-(CH_2)_l-CO-O-$, $-O-(CH_2)_m-O-$, $-O-CO-\phantom{X}-O-(CH_2)_m-O-\phantom{X}-CO-O-$, where l is from 1 to 10 and m is from 2 to 10, $-O-CO-\phantom{X}-CO-O-$, $-O-CO-\phantom{X}\begin{matrix}CO-O-\\ \phantom{X}\end{matrix}$, $-O-CO-\phantom{X}-O-$ or $-O-CO-\phantom{X}\begin{matrix}\\CO-O-\end{matrix}$ and
$E^1$ and $E^2$ are identical or different and each is independently of the other a chemical bond or $C_1$–$C_{15}$-alkylene.

Any alkyl and alkylene appearing in the abovementioned formulae may be either straight-chain or branched.

A suitable $R^1$, $R^2$, $R^3$, $R^4$, $R^5$, $R^6$, $R^8$, $R^{10}$ and $R^{11}$ is for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl or isooctyl.

$R^1$ and $R^5$ may each also be for example nonyl, isononyl, decyl, isodecyl, 2-methoxyethyl, 2-ethoxyethyl, 2-propoxyethyl, 2-butoxyethyl, 2- or 3-methoxypropyl, 2-or 3-ethoxypropyl, 2- or 3-propoxypropyl, 2- or 3-butoxypropyl, 4-methoxybutyl, 4-ethoxybutyl, 4-butoxybutyl, 2-cyanoethyl, 3-cyanopropyl, 4-cyanobutyl, 2-hydroxyethyl,

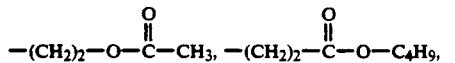

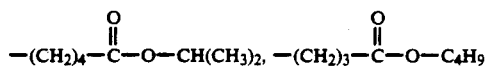

$R^4$ may also be for example phenyl, 2-, 3- or 4-methylphenyl, 2- or 4-isopropylphenyl, 2-butylphenyl, 2-, 3- or 4-methoxyphenyl, 2-propoxyphenyl, 4-butoxyphenyl, 2-(but-2-oxy)phenyl, benzyl, 2-, 3- or 4-methylbenzyl, 2-, 3- or 4-methoxybenzyl, fluorine, chlorine, bromine, 2-thienyl or 3-thienyl.

$R^2$ and $R^3$ may each also be methoxy, ethoxy, propoxy, isopropoxy, butoxy, isobutoxy, sec-butoxy, pentyloxy, isopentyloxy, neopentyloxy or hexyloxy.

$R^2$, $R^3$ and $R^8$ may each also be for example formylamino, acetylamino, propionylamino, butyrylamino, methylsulfonylamino, ethylsulfonylamino, propylsulfonylamino, isopropylsulfonylamino or butylsulfonylamino.

$R^7$ is for example methoxycarbonyl, ethoxycarbonyl, propoxycarbonyl, isopropoxycarbonyl, butoxycarbonyl, 2-methoxyethoxycarbonyl, methylcarbamoyl, ethylcarbamoyl, 2-methoxyethylcarbamoyl, cyclopentyloxycarbonyl, cyclohexyloxycarbonyl, cycloheptyloxycarbonyl, cyclopentylcarbamoyl, cyclohexylcarbamoyl, cycloheptylcarbamoyl, methylsulfamoyl, ethylsulfamoyl, 2-methoxyethylsulfamoyl, cyclopentylsulfamoyl, cyclohexylsulfamoyl, cycloheptylsulfamoyl, methylsulfonylamino, ethylsulfonylamino or p-methylphenylsulfonylamino.

$R^{11}$ and $R^8$ may also be for example cyclopentylcarbonylamino, cyclohexylcarbonylamino or cycloheptylcarbonylamino.

$R^8$ may also be for example cyclopentylsulfonylamino, cyclohexylsulfonylamino or cycloheptylsulfonylamino.

$R^9$ may also be for example 2-methoxyethyl, 2-ethoxyethyl or 3,6-dioxaheptyl.

$R^{10}$ may also be for example 2-, 3- or 4-methylphenyl or 2-, 3- or 4-ethylphenyl.

$R^{11}$ may also be for example methylene, 1,2-ethylene, ethylidene, 1,2- or 1,3-propylene or 1,4-, 1,3- or 2,3-butylene.

D is for example

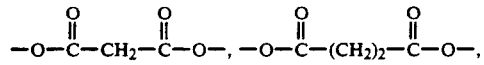

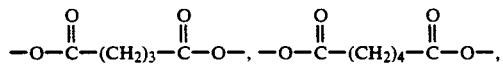

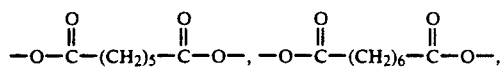

-continued

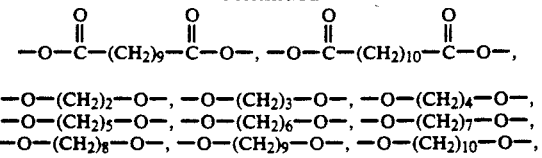

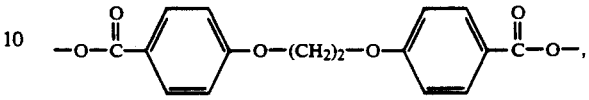

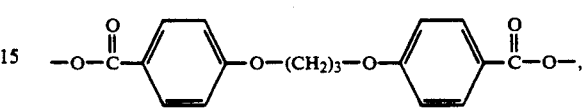

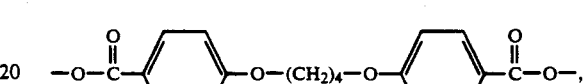

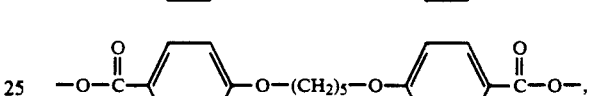

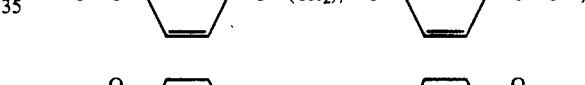

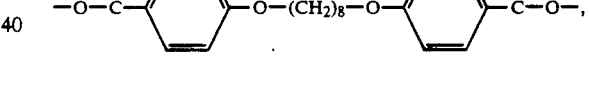

or

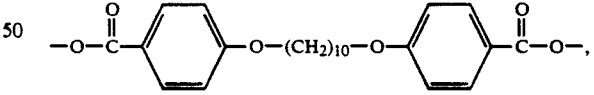

Preference is given to dyes of the formula I in which $Z^1$—L and $Y^1$—L conform to the formulae IIa to IIh and $Z^2$ and $Y^2$, conform to the formula IIIE or IIIF and $R^1$, $R^2$ $R^3$, $R^4$, $R^5$, $R^6$ and $R^{12}$ are each as defined above.

Preference is further given to dyes of the formula I in which $Z^1$—L and $Y^1$—L conform to the formulae IIa to IIJ and $Z^2$ and $Y^2$ conform to the formula IIIA, IIIB or IIIc and $R^1$, $R^2$, $R^3$, $R^5$, $R^6$, $R^7$, $R^8$ and $R^9$ are each as defined above.

Preference is further given to dyes of the formula I in which $Z^1$—L and $Y^1$—L conform to the formula IIi, IIJ or IIk and $Z^2$ and $Y^2$ conform to the formula IIID and $R^{10}$ and $R^{11}$ are each as defined above.

Preference is further given to dyes of the formula I in which $R^1$ and $R^5$ are each independently of the other hydrogen, unsubstituted or cyano- or acetyl-substituted $C_1$-$C_6$-alkyl or cyclohexyl, $R^2$ and $R^3$ are each independently of the other hydrogen, methyl, methoxy or acetylamino, $R^4$ is hydrogen, $C_1$-$C_6$-alkyl or unsubstituted or methyl- or methoxy-substituted phenyl, 2-thienyl or 3-thienyl, and $R^6$ is hydrogen or $C_1$-$C_6$-alkyl.

Preference is further given to dyes of the formula I in which $R^8$ is hydrogen, $C_1$-$C_6$-alkyl or $C_1$-$C_6$-alkanoylamino and $R^9$ is hydrogen or $C_1$-$C_8$-alkyl which may be interrupted by an oxygen atom.

Particular preference is given to dyes of the formula I in which the bridge member L has the formula $$-E^1-D-E^2-$$

where $E^1$ and $E^2$ are each independently of the other $C_1$-$C_4$-alkylene and D is a chemical bond, oxygen,

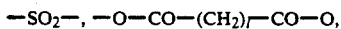

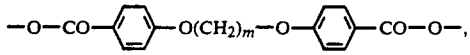

where l is from 2 to 4 and m is from 6 to 10,

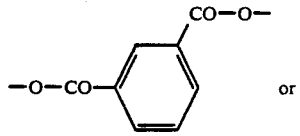

or

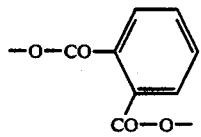

The dyes I according to the present invention can be obtained in a conventional manner, for example as described in GB 1,201,925, U.S. Pat. No. 3,553,245, DE-A-1,569,678, DE-A-2,519,592, DE-A-3,020,473, U.S. Pat. No. 4,839,336, U.S. Pat. No. 4,541,830, EP-A-147,747, U.S. Pat. No. 4,769,360, U.S. Pat. No. 4,695,287, DE-A-3,524,519, U.S. Pat. No. 3,096,339 and U.S. Pat. No. 3,013,013 and in Angew. Chem. 74, (1962), 818.

A preferred procedure comprises for example first linking the later donor groups $Z^1$ and $Y^1$ together by means of an appropriate bridge member and then preparing from the resulting intermediates the dyes I by incorporation of the acceptor groups $Z^2$ and $Y^2$.

By way of illustration see the following synthesis schemes for preparing dyes I (where $Z^1$, $Y^1$, $R^7$ and $R^8$ are in each case as defined above):

a) synthesis of dye intermediates

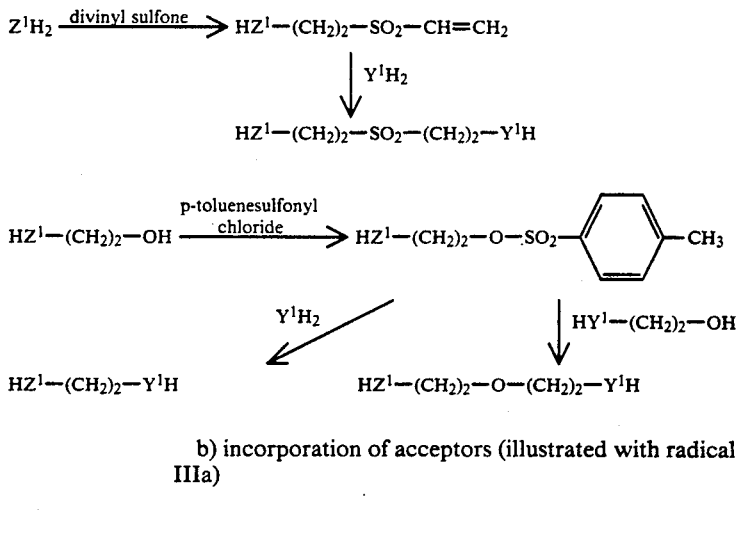

b) incorporation of acceptors (illustrated with radical IIIa)

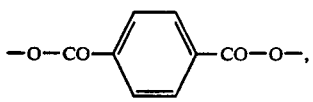

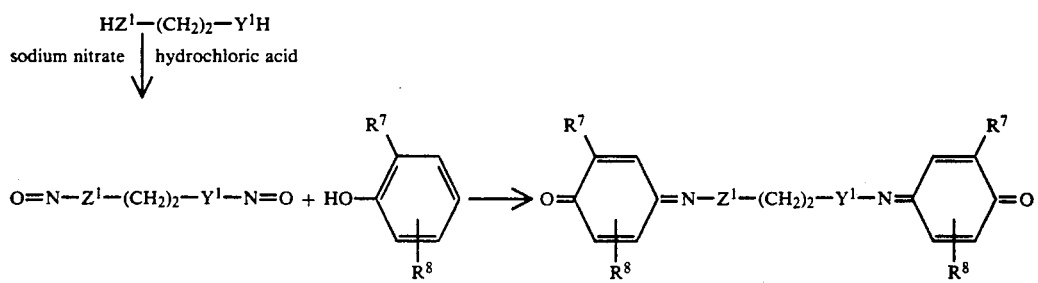

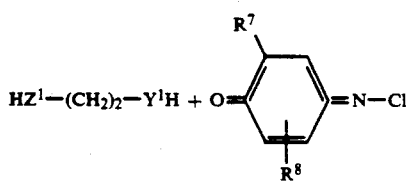

Other dye intermediates can be reacted with particular acceptors in the same way.

The novel dyes I are highly soluble in organic solvents.

It is a further object of the present invention to provide a novel process for the thermal transfer of dyes.

In the thermotransfer printing process, a transfer sheet which contains a thermally transferable dye in one or more binders on a support with or without suitable assistants is heated from the back with an energy source, for example a thermal printing head, in short pulses (lasting fractions of a second), causing the dye to migrate out of the transfer sheet and diffuse into the surface coating of a receiving medium. The essential advantage of this process is that the amount of dye to be transferred (and hence the color gradation) is readily controllable through adjustment of the energy to be supplied by the energy source.

In general, color recording is carried out using the three subtractive primaries yellow, magenta and cyan (with or without black). To ensure optimal color recording, the dyes must have the following properties:
—ready thermal transferability,
—little tendency to migrate within or out of the surface coating of the receiving medium at room temperature,
—high thermal and photochemical stability and resistance to moisture and chemical substances,
—suitable hues for subtractive color mixing,
—a high molar absorption coefficient,
—no tendency to crystallize out on storage of the transfer sheet.

From experience these requirements are very difficult to meet at one and the same time.

For this reason, most of the existing thermal transfer printing dyes do not meet the required property profile.

We have found that the further object is achieved advantageously by a process for transferring a bichromophoric methine dye from a transfer to a sheet of plastic-coated paper with the aid of an energy source, which comprises using a transfer on which there is or are one or more dyes of the formula I $$Z^2-Z^1-L-Y^1-Y^2 \qquad (I)$$

where
L is a bridge member which does not permit any conjugation of $\pi$-electrons between $Z^1$ and $Y^1$,
$Z^1$ and $Y^1$ are identical or different and, together with the bridge member L, each is independently of the other a radical of the formula

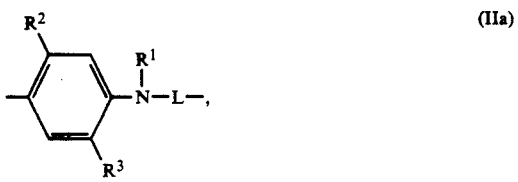

(IIa)

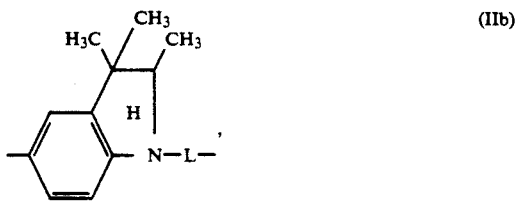

(IIb)

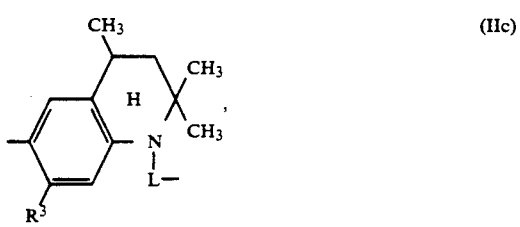

(IIc)

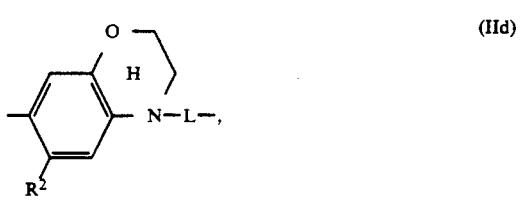

(IId)

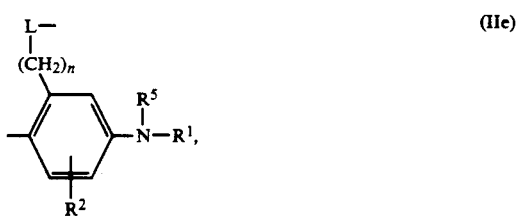

(IIe)

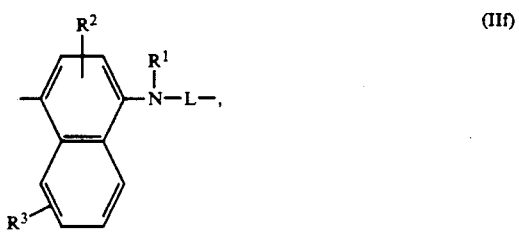

(IIf)

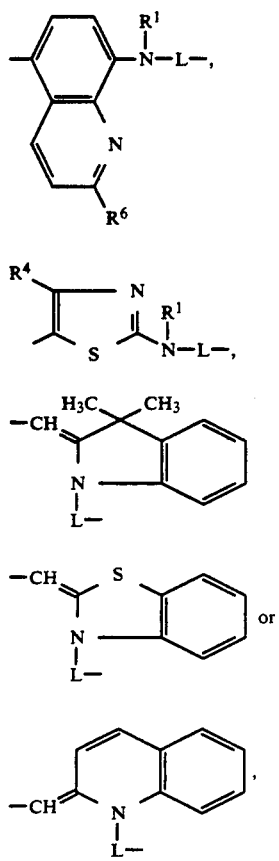

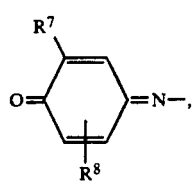

where n is 0 or 1, $R^1$ and $R^5$ are identical or different and each is independently of theotheralkyl, alkoxyalkyl, alkoxycarbonylalkyl or alkanoyloxyalkyl, which may each have up to 10 carbon atoms and be hydroxyl- or cyano-substituted, hydrogen, benzyl, cyclohexyl, phenyl or tolyl, $R^2$ and $R^3$ are identical or different and each is independently of the other hydrogen, $C_1$-$C_8$-alkyl, $C_1$-$C_6$-alkoxy, $C_1$-$C_6$-alkanoylamino or $C_1$-$C_6$-alkylsulfonylamino, $R^4$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxy-substituted benzyl, cyclohexyl, thienyl or —$NHR^1$, where $R^1$ is as defined above, and $R^6$ is hydrogen or $C_1$-$C_8$-alkyl, and $Z^2$ and $Y^2$ are identical or different and each is independently of the other a radical of the formula

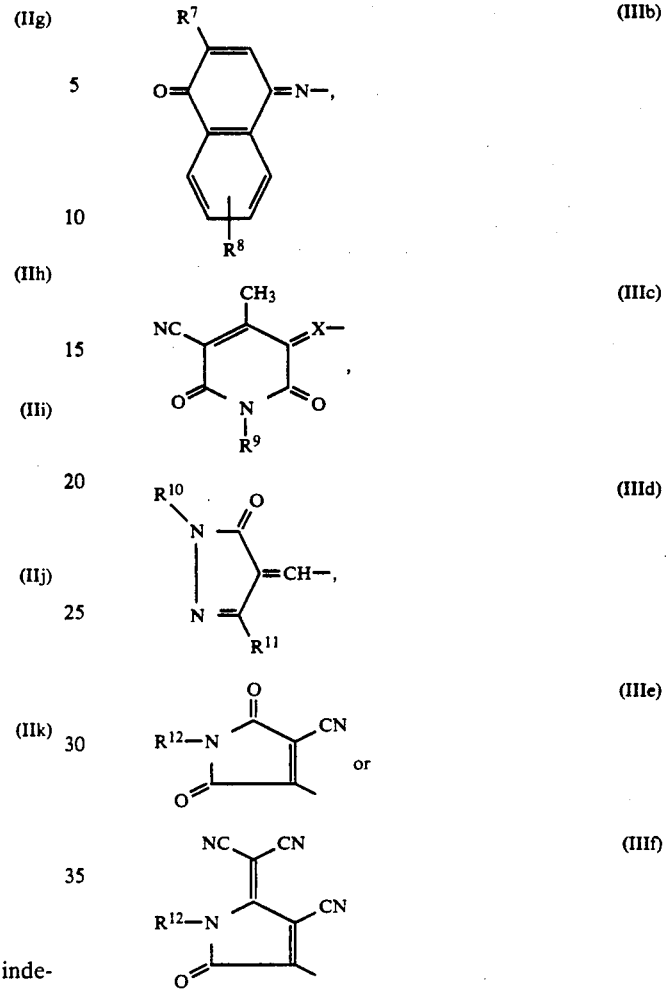

where

X is nitrogen or CH, $R^7$ is $C_1$-$C_6$-alkoxycarbonyl, $C_1$-$C_6$-monoalkylcarbamoyl, $C_1$-$C_6$-monoalkylsulfamoyl, $C_1$-$C_6$-alkanoylamino or $C_1$-$C_6$-alkylsulfonylamino, wherein alkyl may in each case be interrupted by 1 or 2 oxygen atoms, or $C_5$—$C_7$-cycloalkoxycarbonyl, $C_5$-$C_7$-monocycloalkylcarbamoyl, $C_5$-$C_7$-monocycloalkylsulfamoyl, $C_5$-$C_7$-cycloalkylcarbonylamino, phenoxycarbonyl, monophenylcarbamoyl, monophenylsulfamoyl, benzoylamino, phenylsulfonylamino, methylphenylsulfonylamino, fluorine or chlorine, $R^8$ is $C_1$-$C_8$-alkyl, $C_1$-$C_6$-alkanoylamino or $C_1$-$C_6$-alkylsulfonylamino, wherein alkyl may in each case be interrupted by 1 or 2 oxygen atoms, or $C_5$-$C_7$-cycloalkylcarbonylamino, $C_5$-$C_7$-cycloalkylsulfonylamino, benzoylamino, phenylsulfonylamino, hydrogen, fluorine or chlorine, $R^3$ is hydrogen or $C_1$-$C_8$-alkyl which may be interrupted by 1 or 2 oxygen atoms, $R^{10}$ is phenyl or $C_1$-$C_4$-alkylphenyl, $R^{11}$ is $C_1$-$C_8$-alkyl or $C_1$-$C_6$-dialkylamino, and $R^{12}$ is hydrogen or $C_1$-$C_8$-alkyl.

Compared with the dyes used in existing processes, the dyes transferred in the process according to the invention are notable in general for improved fixation in the receiving medium at room temperature, readier thermal transferability, higher lightfastness, higher stability to moisture and chemical substances, better solubility in organic solvents, higher inked ribbon stability and higher purity of hue.

It is also surprising that the dyes of the formula I are readily transferable and that they have a high inked ribbon stability, despite their very high molecular weight.

Existing thermotransfer printing systems use mixtures of monochromophoric dyes to absorb about one third of the incident white light each in the cyan and in the magenta region. This presents the problem that the dyes used must have exactly the same transfer characteristics to ensure that the same amount of dye is transferred to the acceptor for a given power output of the thermal printing head. The process according to the present invention does not suffer from these disadvantages.

Owing to their high molar extinction coefficients and their high brilliance, the dyes of the formula I employed in the novel process are advantageously suitable for preparing a trichromatic system as required for subtractive color mixing.

In addition, the ready transferability permits wide variation of the receiver or acceptor plastics, and thus makes possible very efficient adaptation of the dyes within the overall system of donor/receiver.

To prepare the dye transfers required in the process according to the present invention, the dyes are incorporated into a suitable organic solvent or solvent mixture together with one or more binders and possibly further assistants to form a printing ink in which the dye is preferably present in a moleculary dispersed, dissolved, form. The printing ink can then be applied to an inert support by knife coating and dried in air.

Suitable organic solvents for the dyes I are for example those in which the solubility of the dyes I at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and are capable of binding the dye to the inert support in a form in which it will not rub off. Preference is given to those binders which, after the printing ink has dried in air, hold the dye in a clear, transparent film in which no visible crystallization of the dye occurs.

Examples of such binders are cellulose derivatives, e.g. methylcellulose, ethylcellulose, ethylhydroxyethylcellulose, hydroxypropylcellulose, cellulose acetate and cellulose acetobutyrate, starch, alginates, alkyd resins, vinyl resins, polyvinyl alcohol, polyvinyl acetate, polyvinyl butyrate and polyvinylpyrrolidones. It is also possible to use polymers and copolymers of acrylates or derivatives thereof, such as polyacrylic acid, polymethyl methacrylate or styrene/acrylate copolymers, polyester resins, polyamide resins, polyurethane resins or natural CH resins, such as gum arabic. Other suitable binders are described for example in DE-A-3,524,519.

Preferred binders are ethylcellulose, ethylhydroxyethylcellulose, polyvinyl butyrate and polyvinyl acetate.

The weight ratio of binder:dye is in general within the range from 1:1 to 10:1.

Suitable assistants are for example release agents as mentioned in EP-A-227,092, EP-A-192,435 and the patent applications cited therein. It is also possible to include in particular organic additives which prevent the transfer dyes from crystallizing out in the course of storage or heating of the inked ribbon, for example cholesterol or vanillin.

Inert support materials are for example tissue, blotting or parchment paper and plastics films possessing good heat resistance, for example metallized or unmetallized polyester, polyamide or polyimide. The inert support may additionally be coated on the side facing the thermal printing head with a lubricant or slipping layer in order that adhesion of the thermal printing head to the support material may be prevented. Suitable lubricants are described for example in EP-A-216,483 and EP-A-227,095. The thickness of the support is in general from 3 to 30 μm, preferably from 5 to 10 μm.

The dye-receiving layer can be basically any heat resistant plastics layer having affinity for the dyes to be transferred, for example a modified polycarbonate or polyester. Suitable recipes for the receiving layer composition are described in detail for example in EP-A-227,094, EP-A-133,012, EP-A-133,011, EP-A-111,004, JP-A-199,997/1986, JP-A-283,595/1986, JP-A-237,694/1986 and JP-A-127,392/1986.

Transfer is effected by means of an energy source, for example a laser or a thermal printing head, which must be heatable to ≧300° C. in order that dye transfer may take place within the time range t: $0 < t < 15$ msec. In the course of transfer, the dye migrates out of the transfer sheet and diffuses into the surface coating of the receiving medium.

The dyes according to the present invention are also advantageous for coloring synthetic materials, for example polyesters, polyamides or polycarbonates.

The Examples which follow further illustrate the present invention. Percentages are by weight, unless otherwise stated.

Preparation of dyes

EXAMPLE 1

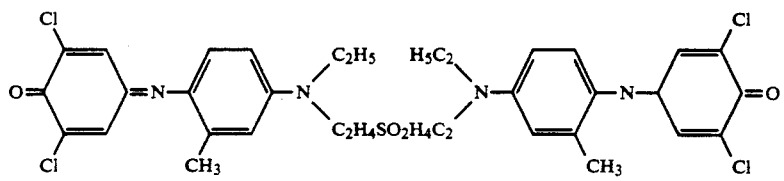

tallization of the dye occurs.

3.9 g of bis-2-(N-ethyl-m-toluidino)ethyl sulfone (obtained as described in U.S. Pat. No. 3,553,245) were introduced into 50 ml of glacial acetic acid. 4.2 g of 2,6-dichlorobenzoquinonechloroimine were added at room temperature with vigorous stirring. After the reaction had ended (check by TLC), the reaction mixture was stirred into an ice/water mixture, the resulting mixture was brought to pH 6 with sodium hydroxide solution (10% by weight), and the resulting precipitate was filtered off with suction, washed with water, dried at 40°-50° C. under reduced pressure and then chromatographed over silica gel with 5:1 v/v toluene/ethyl acetate.

λ$_{max}$ (CH$_2$Cl$_2$): 634 rim

R$_f$=0.33 (5:1 v/v toluene/ethyl acetate).

The dyes listed below were obtained by a similar method.

Explanations concerning Table 1:
Dyes of the formula

Q—W—Q where W is either

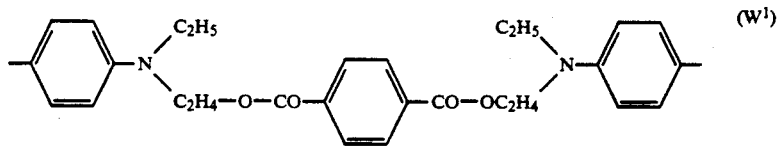

(W$^1$)

or

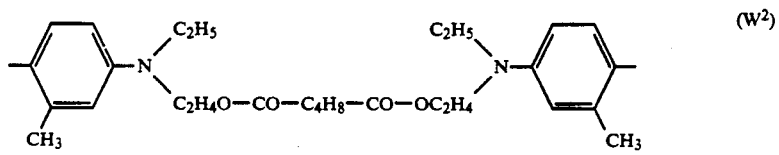

(W$^2$)

The λ$_{max}$ was measured in each case in tetrahydrofuran.

The mobile phase used was
A: ethyl acetate
B: 3:2 v/v toluene/ethyl acetate
C: 8:2 v/v toluene/ethyl acetate
D: 9:1 v/v toluene/ethyl acetate

TABLE 1

| Ex. No. | Q | W | R$_f$ | Mobile phase | λ$_{max}$ [nm] |
|---|---|---|---|---|---|
| 2 | naphthoquinone imine | W$^1$ | 0.14 | A | 597 |
| 3 | naphthoquinone imine | W$^2$ | 0.80 | A | 600 |
| 4 | H$_7$C$_3$—HN—CO-substituted naphthoquinone imine | W$^2$ | 0.48 | B | 638 |
| 5 | H$_7$C$_3$—HN—CO-substituted naphthoquinone imine | W$^2$ | 0.41 | B | 661 |

TABLE 1-continued

| Ex. No. | Q | W | $R_f$ | Mobile phase | $\lambda_{max}$ [nm] |
|---|---|---|---|---|---|
| 6 | cyclohexyl-NH-C(=O)- substituted naphthoquinone imine | $W^1$ | 0.77 | A | 638 |
| 7 | cyclohexyl-NH-C(=O)- substituted naphthoquinone imine | $W^2$ | 0.58 | B | 661 |
| 8 | 5,8-dichloro naphthoquinone imine | $W^1$ | 0.45 | C | 572 |
| 9 | 5,8-dichloro naphthoquinone imine | $W^2$ | 0.16 | D | 588 |
| 10 | $H_3CO_2C$- substituted naphthoquinone imine | $W^1$ | 0.55 | B | 612 |
| 11 | $H_3CO_2C$- substituted naphthoquinone imine | $W^2$ | 0.55 | B | 631 |
| 12 | $NHCOCH_3$, Cl-substituted benzoquinone imine | $W^2$ | 0.18 | A | 675 |

TABLE 1-continued

| Ex. No. | Q | W | $R_f$ | Mobile phase | $\lambda_{max}$ [nm] |
|---|---|---|---|---|---|
| 13 | 4-chloro-benzoquinone imine | $W^2$ | 0.26 | A | 619 |
| 14 | 2-chloro-6-methyl-benzoquinone imine | $W^2$ | 0.28 | B | 631 |
| 15 | 2,5-dichloro-benzoquinone imine | $W^2$ | 0.24 | B | 661 |
| 16 | 2-chloro-benzoquinone imine | $W^2$ | 0.21 | B | 635 |
| 17 | 2-chloro-5-methyl-benzoquinone imine | $W^2$ | 0.34 | B | 633 |
| 18 | 2-acetamido-benzoquinone imine | $W^2$ | 0.18 | A | 628 |
| 19 | 2-acetamido-5-chloro-benzoquinone imine | $W^1$ | 0.28 | B | 642 |
| 20 | 2-chloro-6-methyl-benzoquinone imine | $W^1$ | 0.17 | C | 600 |
| 21 | 2-methyl-5-chloro-benzoquinone imine | $W^1$ | 0.25 | C | 603 |

TABLE 1-continued

| Ex. No. | Q | W | $R_f$ | Mobile phase | $\lambda_{max}$ [nm] |
|---|---|---|---|---|---|
| 22 | (2,5-dichloro-quinone imine) | $W^1$ | 0.21 | C | 633 |
| 23 | (2,6-dichloro-quinone imine) | $W^2$ | 0.28 | A | 665 |
| 24 | (2,3-dichloro-quinone imine) | $W^1$ | 0.51 | B | 631 |
| 25 | (NHCOCH$_3$-quinone imine) | $W^2$ | 0.49 | A | 616 |

Explanations concerning Table 2
Dyes of the formula

Q—W—Q where W is either

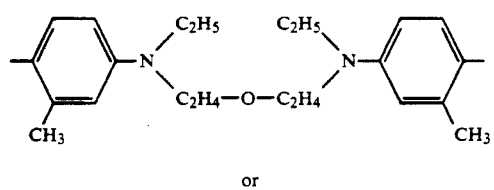

or

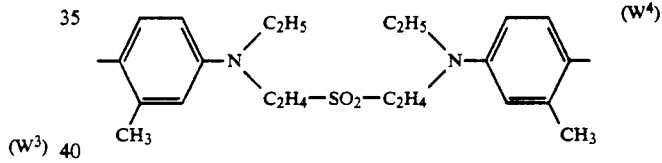

The $\lambda_{max}$ was measured in each case in methylene chloride (a) or acetone (b).

The mobile phase used was
A: ethyl acetate
B: 3:2 v/v toluene/ethyl acetate
E: 5:1 v/v toluene/ethyl acetate

TABLE 2

| Ex. No. | Q | W | $R_f$ | Mobile phase | $\lambda_{max}$ [nm] |
|---|---|---|---|---|---|
| 26 | (3-methyl-5-chloro-quinone imine) | $W^3$ | 0.54 | E | 633 (b) |
| 27 | (naphthoquinone imine with CO—NH—C$_3$H$_7$) | $W^3$ | 0.43 | E | 673 (b) |

TABLE 2-continued

| Ex. No. | Q | W | $R_f$ | Mobile phase | $\lambda_{max}$ [nm] |
|---|---|---|---|---|---|
| 28 | naphthoquinone-imine with CO—NH—CH(C₂H₅)₂ | $W^3$ | 0.45 | E | 647 (b) |
| 29 | naphthoquinone-imine with CO—NH—CH(CH₃)₂ | $W^3$ | 0.30 | E | 673 (b) |
| 30 | 2,5-dichloro-benzoquinone-imine | $W^3$ | 0.52 | E | 663 (b) |
| 31 | 2-chloro-5-methyl-benzoquinone-imine | $W^3$ | 0.58 | E | 636 (b) |
| 32 | naphthoquinone-imine with CO—NH—C₂H₄—cyclohexyl | $W^3$ | 0,49 | E | 675 (b) |
| 33 | naphthoquinone-imine with CO—NH—CH(CH₃)(C₂H₅) | $W^4$ | 0,86 | A | 644 (a) |
| 34 | naphthoquinone-imine with CO—NH—C₃H₇ | $W^4$ | 0,69 | A | 643 (a) |

TABLE 2-continued
| Ex. No. | Q | W | $R_f$ | Mobile phase | $\lambda_{max}$ [nm] |
|---|---|---|---|---|---|
| 35 | 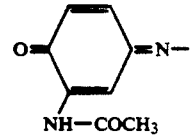 | $W^4$ | 0,48 | A | 614 (a) |
| 36 | 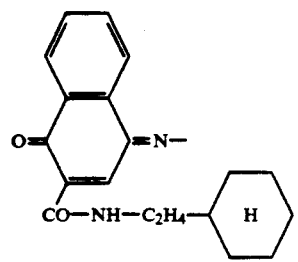 | $W^4$ | 0,15 | E | 647 (a) |
| 37 | 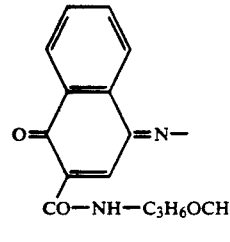 | $W^4$ | 0,18 | A | 644 (a) |
| 38 | 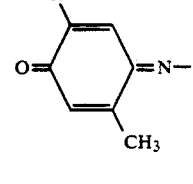 | $W^4$ | 0,76 | B | 612 (a) |
| 39 |  | $W^4$ | 0,81 | A | 649 (a) |
| 40 | 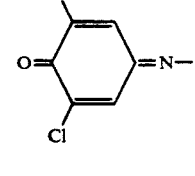 | $W^4$ | 0,89 | A | 610 (b) |
| 41 | 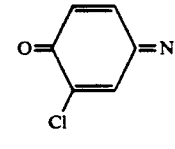 | $W^4$ | 0,88 | A | 615 (b) |
| 42 | 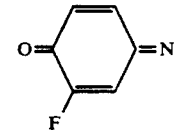 | $W^4$ | 0,88 | A | 601 (b) |

TABLE 2-continued

| Ex. No. | Q | W | $R_f$ | Mobile phase | $\lambda_{max}$ [nm] |
|---|---|---|---|---|---|
| 43 | (structure) | $W^4$ | 0,74 | B | 646 (b) |

EXAMPLE 44

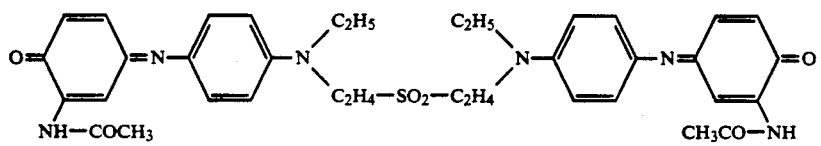

$\lambda_{max}$ (CH$_2$CL$_2$): 596 nm
$R_f$: 0.25 (ethyl acetate)

EXAMPLE 45

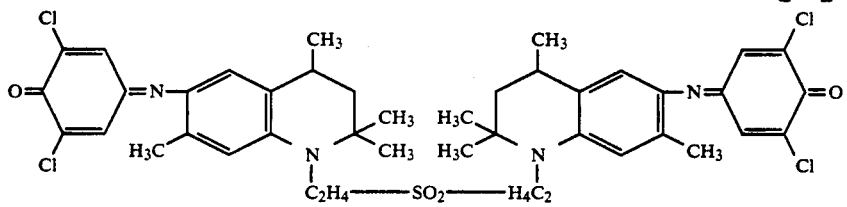

$\lambda_{max}$ (CH$_2$Cl$_2$): 670 run
$R_f$: 0.27 (5:1 v/v toluene/ethyl acetate)

Transfer of dyes

For a simple quantitative examination of the transfer characteristics of the dyes, the thermal transfer was effected with large hotplates instead of a thermal printing head, the transfer temperature being varied within the range 70° C.<T<120° C. while the transfer time was fixed at 2 minutes.

α) General recipe for coating the support with dye: 1 g of binder was dissolved in 8 ml of 8:2 v/v toluene/ethanol at 40°-50° C. A solution of 0.25 g of dye in 5 ml of tetrahydrofuran was added with stirring, and any insolubles were filtered off. The print paste thus obtained was applied with an 80 μm doctor-bladetoapolyestersheet (thickness: 6-10 μm) and dried with a hairdryer.

β) Testing of thermal transferability

The dyes used were tested as follows:

The polyester sheet donor containing the dye under test in the coated front was placed face down on commercial receiver paper (specified hereinafter) and pressed down. Donor/receiver were then wrapped in aluminum foil and heated between two hotplates at various temperatures T (within the temperature range 70° C.<T<120° C.). The amount of dye diffusing into the bright plastics layer of the receiver is proportional to the optical density (=absorbance A). The latter was determined photometrically. A plot of the logarithm of the absorbance A of the colored receiver papers measured within the temperature range from 80° to 110° C. against the reciprocal of the corresponding absolute temperature is a straight line from whose slope it is possible to calculate the activation energy $\Delta E_T$ for the transfer experiment:

$$\Delta E_T = 2.3 \cdot R \cdot \frac{\Delta \log A}{\Delta\left[\frac{1}{T}\right]}$$

To complete the characterization, it is additionally possible to read from the plots the temperature T* [° C.]at which the absorbance A of the colored receiver papers attains the value 1.

The dyes listed in the tables below were processed according to α), and the dye-coated transfers obtained were tested for their transfer characteristics according to β). The tables show in each case the thermal transfer parameters T* and $\Delta E_T$, the absorption maxima of the dyes $\lambda_{max}$ (where measured), the binders used and the weight ratio of dye:binder:assistant.

The key to the abbreviations is as follows:
D=dye
B=binder
EC=ethylcellulose
VL=Vylone ®(from Toyobo)
HCVPP=Hitachi Color Video Print Paper (receiver)
VYC=Hitachi VY-C Paper (receiver)
VYT=Hitachi VY-T Paper (receiver)
VYSX=Hitachi VY-SX Paper (receiver)
VYS=Hitachi VY-S Paper (receiver)
SV 100=Kodak Color Video Print Paper (receiver)

| Ex. No. | Dye No. | T* [°C.] | $\Delta E_T$ [kJ/mol] | B | D:B | Receiver |
|---|---|---|---|---|---|---|
| 46 | 45 | 114 | 86 | EC | 1:2 | SV 100 |
| 47 | 45 | 118 | 70 | EC | 1:2 | HCYPP |
| 48 | 1 | 150 | 66 | EC | 1:2 | VYC |
| 49 | 1 | 120 | 48 | EC | 1:2 | VYSX |
| 50 | 17 | 86 | 42 | VL | 1:4 | YYS |
| 51 | 33 | 120 | 32 | VL | 1:2 | HCVPP |

-continued

| Ex. No. | Dye No. | T* [°C.] | $\Delta E_T$ [kJ/mol] | B | D:B | Receiver |
|---|---|---|---|---|---|---|
| 532 | 33 | 114 | 48 | VL | 1:2 | VYC |
| 53 | 33 | 101 | 78 | VL | 1:2 | VYT |
| 54 | 34 | 107 | 52 | VL | 1:2 | HCVPP |
| 55 | 34 | 113 | 35 | VL | 1:2 | VYC |
| 56 | 34 | 108 | 24 | VL | 1:2 | VYT |
| 57 | 35 | 106 | 57 | VL | 1:2 | HCVPP |
| 58 | 35 | 111 | 51 | VL | 1:2 | VYC |
| 59 | 35 | 101 | 75 | VL | 1:2 | VYT |
| 60 | 36 | 118 | 61 | VL | 1:2 | VYC |
| 61 | 36 | 101 | 82 | VL | 1:2 | VYT |
| 62 | 37 | 93 | 78 | VL | 1:2 | VYC |
| 63 | 37 | 87 | 69 | VL | 1:2 | VYT |
| 64 | 38 | 127 | 47 | VL | 1:4 | HCVPP |
| 65 | 38 | 122 | 43 | VL | 1:4 | VYC |
| 66 | 38 | 107 | 51 | VL | 1:4 | VYT |
| 67 | 44 | 138 | 74 | EC | 1:2 | HCVPP |

Q—W—Q where W is either

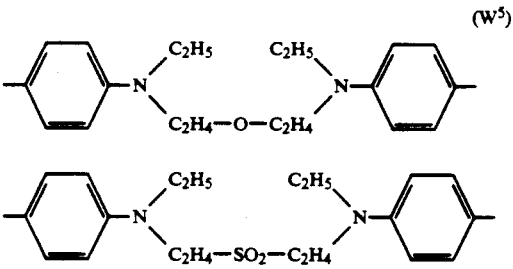

The $\lambda_{max}$ was measured in each case in methylene chloride.

TABLE 2

| Ex. No. | Q | W | $\lambda_{max}$ [nm] | T* [°C.] | $\Delta E_T$ [kJ/mol] | B | D:B | Receiver |
|---|---|---|---|---|---|---|---|---|
| 68 | (O=, =N—, NH—COCH₃ substituted quinone) | $W^5$ | 619 | 118 | 85 | EC | 1:2 | VYC |
| 69 | (O=, =N—, NH—SO₂—C₆H₄—CH₃ substituted quinone) | $W^5$ | 627 | 129 | 88 | EC | 1:2 | VYC |
| 70 | (naphthoquinone, =N—, CO—NH—C₂H₄OCH₃) | $W^6$ | 627 | 131 | 64 | EC | 1:2 | HCVPP |
| 71 | (O=, =N—, NH—COCH₃ substituted quinone) | $W^6$ | 596 | 138 | 74 | EC | 1:2 | HCVPP |
| 72 | (naphthoquinone, =N—, CO—NH—CH(CH₃)—C₃H₆—CH(CH₃)₂) | $W^6$ | 624 | 144 | 98 | EC | 1:2 | HCVPP |

Explanations concerning Table 4:
Transfer of dyes of the formula

The same method can be used to transfer the following dyes:

| Example No. | | | |
|---|---|---|---|
| 73 | 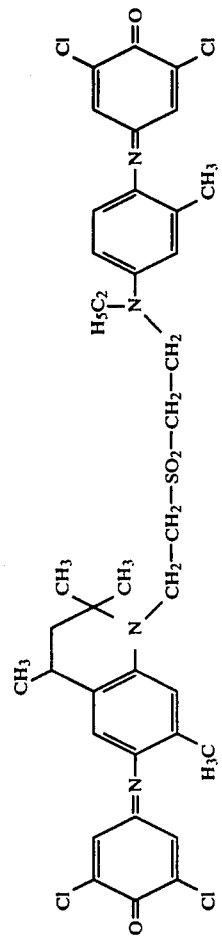 | | |
| 74 | | 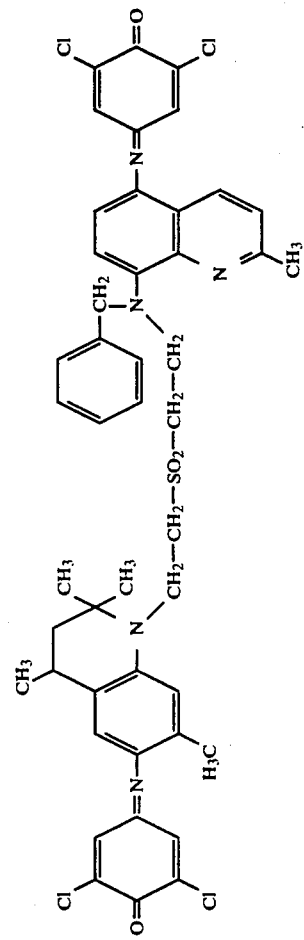 | |
| 75 | | | 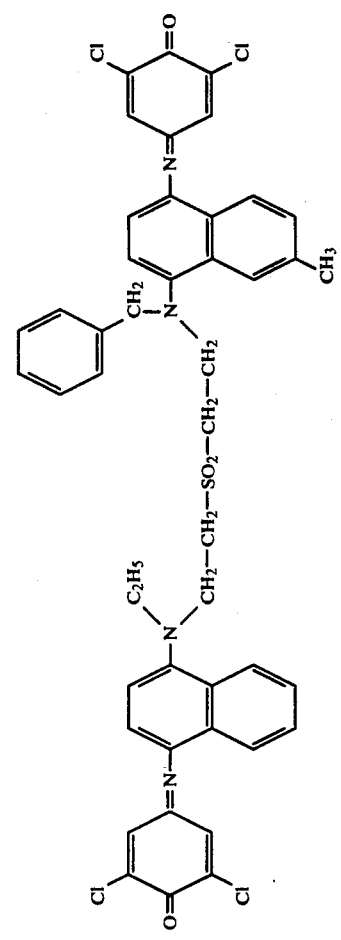 |

| Example No. | | | | | |
|---|---|---|---|---|---|
| 76 | 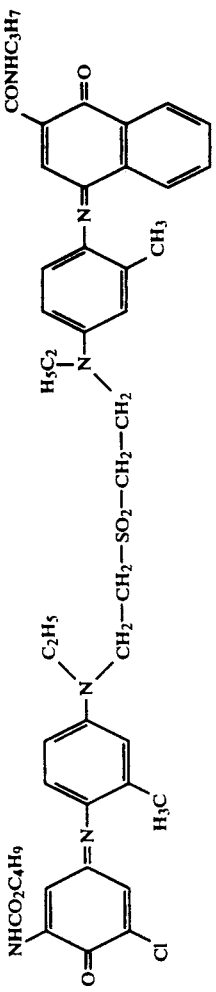 | | | | |
| 77 | | 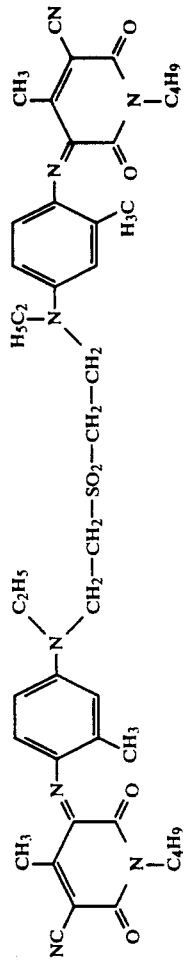 | | | |
| 78 | | | 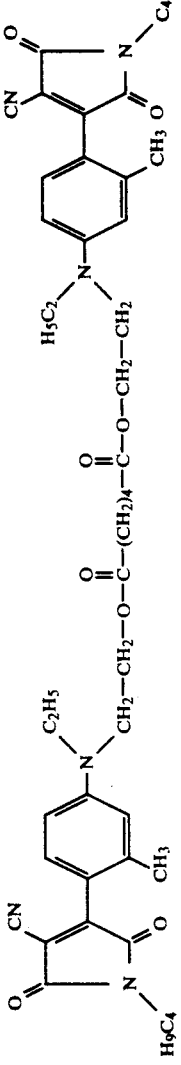 | | |
| 79 | | | | 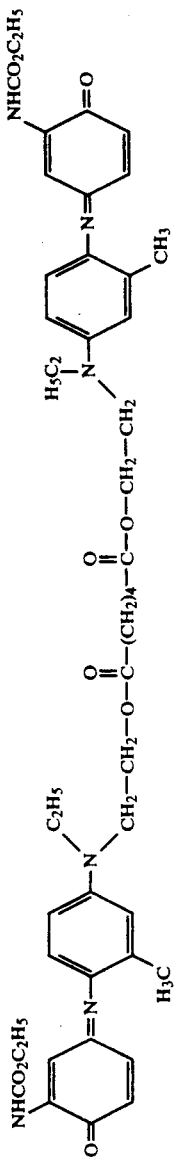 | |
| 80 | | | | | 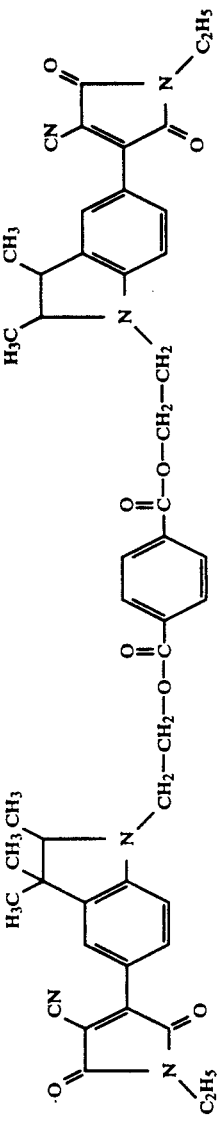 |

-continued

| Example No. | |
|---|---|
| 81 | (structure) |
| 82 | (structure) |
| 83 | (structure) |
| 84 | (structure) |

-continued

| Example No. | |
|---|---|
| 85 | (structure) |
| 86 | (structure) |
| 87 | (structure) |

-continued

| Example No. | |
|---|---|
| 88 | (structure with H₃CHNO₂S and NHCOC₂H₅ substituents on quinone-imine rings linked through dimethylbenzene units bearing CH₃ groups and N(C(CH₃)₂CH₃)CH₂—CH₂—SO₂—CH₂—CH₃ side chains) |
| 89 | (structure with two NHC(O)CH₃-substituted quinone-imine rings linked to a central phenyl bearing CH₃, with N substituted by C₂H₅, (CH₂)₂—O—C(O)—CH₃, and CH₂—CH₂—SO₂—CH₂—CH₃) |

We claim:
1. A process for transferring a bichromophoric methine dye from a transfer sheet to a sheet of plastic-coated receiving paper, comprising:
heating said transfer sheet in an image wise fashion thereby transferring said bichromophoric methine dye from a transfer sheet to said sheet of plastic coated receiving sheet, said transfer sheet having thereon one or more dyes of formula I:

$$Z^2-Z^1-E^1-D-E^2-Y^1-Y^2 \quad (I)$$

wherein D
is a chemical bond, oxygen, $-SO_2-$, $-O-CO-O-$, 1,4-cyclohexylene, phenylene,

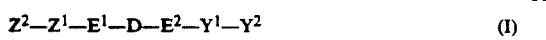

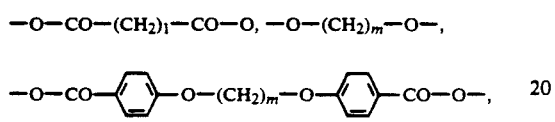

where l is from 1 to 10 and m is from 2 to 10,

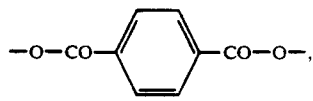

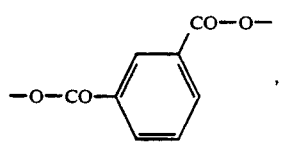

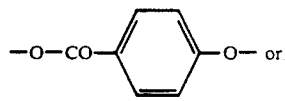

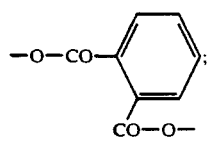

E and $E^2$ are identical or different and each independently is a chemical bond or $C_1$-$C_{15}$-alkylene;
$Z^1$ and $Y^1$ are identical or different and, together with the bridge member L, each is independently of the other a radical of the formula:

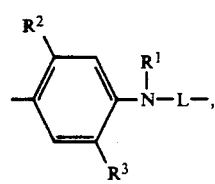    (IIa)

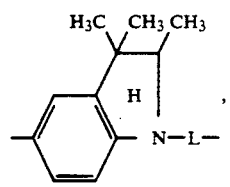    (IIb)

-continued

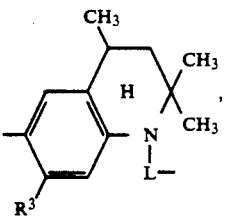    (IIc)

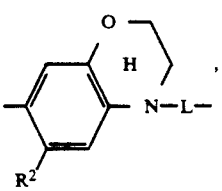    (IId)

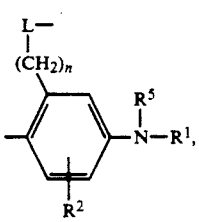    (IIe)

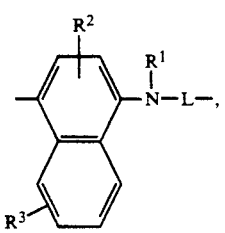    (IIf)

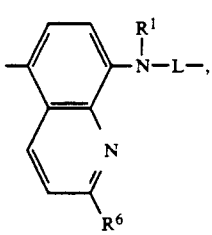    (IIg)

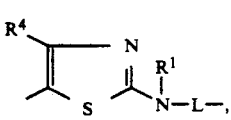    (IIh)

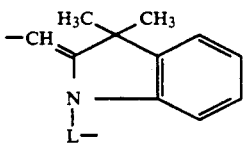    (IIi)

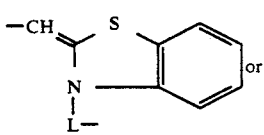    (IIj)

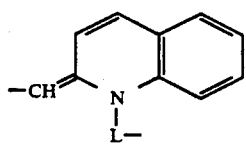 (IIk)

wherein
n is 0 or 1, $R^1$ and $R^5$ are identical or different and each is independently of the other alkyl, alkoxyalkyl, alkoxycarbonylalkyl or alkanoyloxyalkyl, which may each have up to 10 carbon atoms and by hydroxyl- or cyano-substituted, hydrogen, benzyl, cyclohexyl, phenyl or tolyl, $R^2$ and $R^3$ are identical or different and each is independently of the other hydrogen, $C_1$-$C_8$-alkyl, $C_1$-$C_6$-alkoxy, $C_1$-$C_6$-alkanoylamino or $C_1$-$C_6$-alkylsulfonylamino, $R^4$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxy-substituted benzyl, cyclohexyl, thienyl or —$NHR^1$, where $R^1$ is as defined above, and $R^6$ is hydrogen or $C_1$-$C_6$-alkyl, and $Z^2$ and $Y^2$ are identical or different and each is independently of the other a radical of the formula

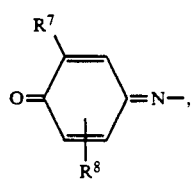 (IIIa)

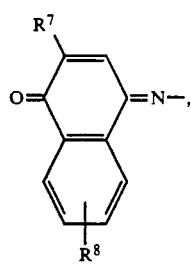 (IIIb)

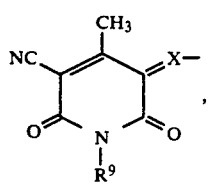 (IIIc)

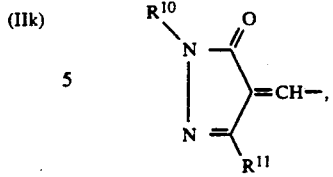 (IIId)

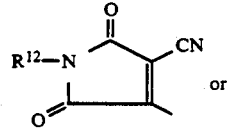 (IIIe)

or

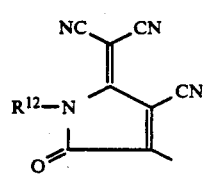 (IIIf)

wherein
X is nitrogen or CH, $R^7$ is $C_1$-$C_6$-alkoxycarbonyl, $C_1$-$C_6$-monoalkylcarbamoyl, $C_1$-$C_6$-monoalkylsulfamoyl, $C_1$-$C_6$-alkanoylamino or $C_1$-$C_6$-alkylsulfonylamino, wherein alkyl may in each case be interrupted by 1 or 2 oxygen atoms, or $C_5$-$C_7$-cycloalkoxycarbonyl, $C_5$-$C_7$-monocycloalkylcarbamoyl, $C_5$-$C_7$-monocycloalkylsulfamoyl, $C_5$-$C_7$-cycloalkylcarbonylamino, phenoxycarbonyl, monophenylcarbamoyl, monophenylsulfamoyl, benzoylamino, phenylsulfonylamino, methylsulfonylamino, fluorine or chlorine, $R^8$ is $C_1$-$C_8$-alkyl, $C_1$-$C_6$-alkanoylamino, $C_1$-$C_6$-alkylsulfonylamino, wherein alkyl may in each case be interrupted by 1 or 2 oxygen atoms, or $C_5$-$C_7$-cycloalkylcarbonylamino, $C_5$-$C_7$-cycloalkylsulfonylamino, benzoylamino, phenylsulfonylamino, hydrogen, fluorine or chlorine, $R^9$ is hydrogen or $C_1$-$C_8$-alkyl which may be interrupted by 1 or 2 oxygen atoms, $R^{10}$ is phenyl or $C_1$-$C_4$-alkylphenyl, $R^{11}$ is $C_1$-$C_8$-alkyl or $C_1$-$C_6$-dialkylamino, and $R^{12}$ is hydrogen or $C_1$-$C_8$-alkyl.

2. The process of claim 1, wherein $Y^1$ and $Z^1$, together with the bridge member $E^1$—D—$E^2$, are each independently a group of the formula IIa, IIe or IIf, and $Y^2$ and $Z^2$, independently, are a group of the formula IIIa or IIIb.

3. The process of claim 1, wherein $Y^1$ or $Z^1$ is a group of the formula IIa.

4. The process of claim 1, wherein $Y^1$ or $Z^1$ is a group of the formula IIe.

5. The process of claim 1, wherein $Y^1$ or $Z^1$ is a group of the formula IIf.

6. The process of claim 1, wherein $Y^2$ or $Z^2$ is a group of the formula IIIa.

7. The process of claim 1, wherein $Y^2$ or $Z^2$ is a group of the formula IIIb.

* * * * *

UNITED STATES PATENT AND TRADEMARK OFFICE
CERTIFICATE OF CORRECTION

PATENT NO.   :   5,281,572
DATED        :   January 25, 1994
INVENTOR(S)  :   Volker Bach et al.

It is certified that error appears in the above-indentified patent and that said Letters Patent is hereby corrected as shown below:

On the title page, Item [54] and Column 1, Line 1, the title should read as follows:

--BICHROMOPHORIC METHINE AND AZAMETHINE DYES AND PROCESS FOR TRANSFERRING THEM--

Signed and Sealed this

Twenty-first Day of June, 1994

Attest:

BRUCE LEHMAN

*Attesting Officer*    *Commissioner of Patents and Trademarks*